United States Patent
Watanabe et al.

(10) Patent No.: US 8,825,330 B2
(45) Date of Patent: Sep. 2, 2014

(54) VEHICLE BRAKE DEVICE

(75) Inventors: Yoshinori Watanabe, Gotenba (JP);
Hiroyuki Matsubayashi, Sunto-gun (JP); Hidehisa Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/000,029

(22) PCT Filed: Feb. 3, 2012

(86) PCT No.: PCT/JP2012/053029
§ 371 (c)(1),
(2), (4) Date: Aug. 16, 2013

(87) PCT Pub. No.: WO2012/114893
PCT Pub. Date: Aug. 30, 2012

(65) Prior Publication Data
US 2013/0325253 A1    Dec. 5, 2013

(30) Foreign Application Priority Data
Feb. 23, 2011  (JP) ................................ 2011-037335

(51) Int. Cl.
*G06F 7/70* (2006.01)

(52) U.S. Cl.
USPC ........................................................ 701/70

(58) Field of Classification Search
None
See application file for complete search history.

(56) References Cited

U.S. PATENT DOCUMENTS 5,170,769 A    12/1992  Berger et al.
6,360,592 B1   3/2002   Harris et al.
6,382,737 B1   5/2002   Isono et al.
6,394,561 B1   5/2002   Sakamoto et al.
2002/0045514 A1*  4/2002  Hosotani et al. ................ 477/65
2002/0063469 A1   5/2002   Nishio (Continued)

FOREIGN PATENT DOCUMENTS

CN    1751928 A    3/2006
CN    101655406 A    2/2010

(Continued)

OTHER PUBLICATIONS

International Search Report Issued Sep. 26, 2012 in PCT/JP12/053029 Filed Feb. 3, 2012.

(Continued)

*Primary Examiner* — Thomas Tarcza
*Assistant Examiner* — Adam Alharbi
(74) *Attorney, Agent, or Firm* — Oblon, Spivak, McClelland, Maier & Neustadt, L.L.P.

(57) ABSTRACT

In a vehicle brake device having a hydraulic pressure sensor for detecting an output value corresponding to the pressure of a fluid pressure adjusted by a master cylinder and a master cylinder pressure calculating unit for storing the output value of the hydraulic pressure sensor at which the pressure of the master cylinder becomes 0 as a zero-point correction value and calculating a master cylinder pressure by correcting the output value of the hydraulic pressure sensor based on the zero-point correction value, the vehicle brake device has a zero-point correction value updating unit for setting, when the output value detected by the hydraulic pressure sensor is smaller than the zero-point correction value stored in the master cylinder pressure calculating unit, the output value as a new zero-point correction value and updating the zero-point correction value.

10 Claims, 3 Drawing Sheets

(56) References Cited

U.S. PATENT DOCUMENTS

| | | |
|---|---|---|
| 2002/0166369 A1 | 11/2002 | Harris et al. |
| 2003/0154762 A1 | 8/2003 | Haas et al. |
| 2006/0131954 A1 | 6/2006 | Ogawa et al. |
| 2010/0179740 A1 | 7/2010 | Lubbers |
| 2010/0222980 A1 | 9/2010 | Berr |
| 2012/0151914 A1* | 6/2012 | Nishioka et al. ............. 60/545 |
| 2012/0160580 A1* | 6/2012 | Nakata ................. 180/65.29 |
| 2013/0218435 A1* | 8/2013 | Nakamura ................. 701/70 |

FOREIGN PATENT DOCUMENTS

| | | |
|---|---|---|
| DE | 40 04 086 | 8/1991 |
| DE | 100 44 223 | 4/2001 |
| EP | 1 004 494 | 5/2000 |
| EP | 1 671 865 | 6/2006 |
| GB | 2 340 903 | 3/2000 |
| JP | 2005 47386 | 2/2005 |
| JP | 2006 248294 | 9/2006 |
| WO | 01 79948 | 10/2001 |
| WO | 2008 066892 | 6/2008 |

OTHER PUBLICATIONS

U.S. Appl. No. 13/878,850, filed Apr. 11, 2013, Matsubayashi et al.

* cited by examiner

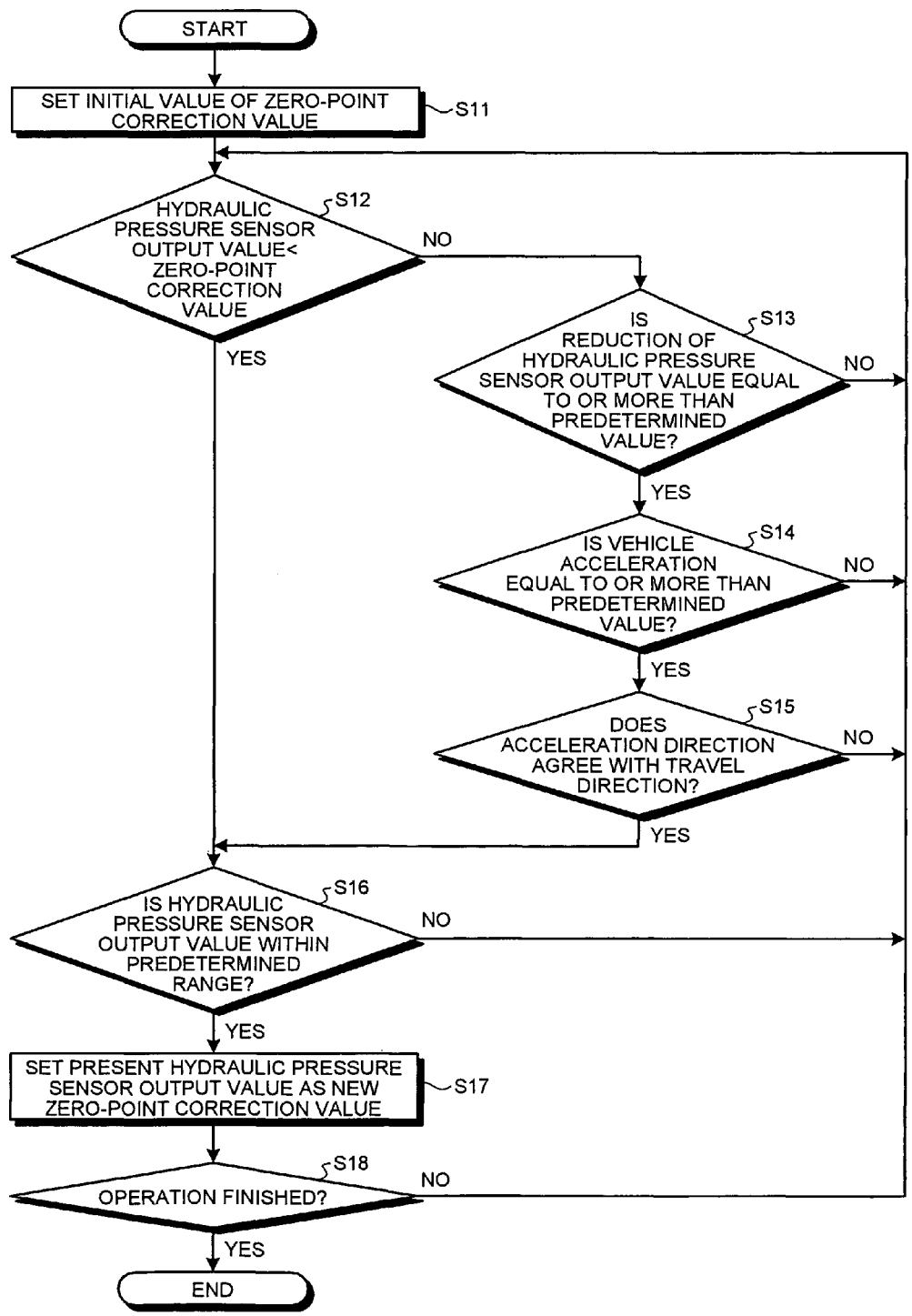

VEHICLE BRAKE DEVICE

TECHNICAL FIELD

The present invention relates to a vehicle brake device.

BACKGROUND ART

Conventionally, there is known a vehicle brake device for detecting the pressure of a master cylinder which is varied in response to the brake operation amount of a driver by a detection means such as a pressure sensor and the like and controlling the lighting state of a brake lamp and controlling the brakes of respective wheels based on the detected master cylinder pressure.

In general, in the sensors such as the pressure sensor and the like, since a sensor output value corresponding to a zero-point is varied by a secular variation such as a temperature drift and the like and an aged deterioration, a phenomenon may occur in that a sensor output value is not zero regardless that an actual pressure is zero, i.e. a so-called zero-point offset.

In the vehicle brake device, to accurately control the turn-on of a brake lamp and the brakes of respective wheels, it is necessary to overcome the influence of the zero-point offset of the pressure sensor. Accordingly, the master cylinder pressure is calculated by excluding the influence of the zero-point offset by correcting the output value of the pressure sensor based on an optional zero-point correction value.

The zero-point offset amount of the pressure sensor may be varied by the secular variation and the aged deterioration as described above, it is necessary to appropriately update also the zero-point correction value of the pressure sensor. For example, Patent Literature 1 discloses a technology for determining, when a stop lamp switch is turned off (when a brake lamp is not lit), no brake operation is executed, that is, a brake pedal is not depressed and an intrinsic master cylinder pressure must be 0 and updating the zero-point correction value of a pressure sensor at the timing.

CITATION LIST

Patent Literature

Patent Literature 1: Japanese Patent Application Laid-open No. 2005-47386

DISCLOSURE OF INVENTION

Problems to be Solved by the Invention

In the pressure sensor correction technology disclosed in Patent Literature 1, the on/off state of the stop lamp switch is checked to determine whether or not the brake operation of a driver is executed based on the assumption that the stop lamp switch is provided. Accordingly, when a brake system is not provided with a stop lamp switch and even when abnormality occurs in a stop lamp switch, since the brake operation of the driver cannot be determined, there is a possibility the zero-point correction value of a pressure sensor for detecting a master cylinder pressure cannot be appropriately updated.

An object of the present invention, which was made in view of the circumstances, is to provide a vehicle brake device capable of appropriately updating the zero-point correction value of a pressure sensor for detecting a master cylinder pressure.

Solutions to the Problems

A vehicle brake device according to the present invention includes a master cylinder that adjusts a fluid pressure for acting a brake force to respective wheels of a vehicle in response to a brake operation amount of a driver; a pressure sensor that detects an output value corresponding to a pressure of the fluid pressure adjusted by the master cylinder; and a pressure calculating unit that stores the output value of the pressure sensor at which the pressure of master cylinder becomes 0 as a zero-point correction value, and calculates the pressure by correcting the output value detected by the pressure sensor based on the zero-point correction value, wherein when the output value detected by the pressure sensor is smaller than the zero-point correction value stored in the pressure calculating unit, a zero-point correction value updating unit sets the output value as a new zero-point correction value and updates the zero-point correction value.

Further, it is preferable that the vehicle brake device further includes an acceleration sensor that detects an acceleration of the vehicle, wherein when the acceleration of the vehicle detected by the acceleration sensor is equal to or more than a predetermined value, the zero-point correction value updating unit preferably sets the output value detected by the pressure sensor as a new zero-point correction value.

Further, it is preferable that the vehicle brake device further includes a travel direction detecting unit that detects a travel direction of the vehicle, wherein when the acceleration of the vehicle detected by the acceleration sensor is equal to or more than the predetermined value as well as the travel direction of the vehicle detected by the travel direction detecting unit is the same as the direction of the acceleration, the zero-point correction value updating unit preferably sets the output value detected by the pressure sensor as a new zero-point correction value.

Further, it is preferable that the vehicle brake device further includes a change amount calculating unit that calculates a change amount of the master cylinder pressure, wherein when the change amount calculated by the change amount calculating unit is equal to or more than a predetermined value in a negative direction, the zero-point correction value updating unit preferably sets the output value detected by the pressure sensor as the zero-point correction value.

Further, it is preferable that, in the vehicle brake device, when the actual pressure of the master cylinder is 0, an initial value of the zero-point correction value is preferably made to be a maximum value in the predetermined range of the output values which can be employed by the pressure sensor.

Effects of the Invention

In the vehicle brake device according to the present invention, when the output value of the pressure sensor is smaller than a present zero-point correction value, the output value at the time is set as the new zero-point correction value by the zero-point correction value updating unit and the zero-point correction value is updated. Accordingly, the status in which the zero-point correction value is to be updated can be identified by comparing the output value of the hydraulic pressure sensor with the zero-point correction value without particularly determining whether or not a non-braked state exists. As a result, the vehicle brake device according to the present invention achieves an effect that the zero-point correction value of the pressure sensor for detecting the master cylinder pressure can be updated at an appropriate timing even in, for example, a brake system provided with no stop lamp switch and even when abnormality occurs in a stop lamp switch.

BRIEF DESCRIPTION OF DRAWINGS

FIG. 3 is a flowchart showing an update process of a zero-point correction value by the brake device of the embodiment.

DESCRIPTION OF EMBODIMENTS

An embodiment of a vehicle brake device according to the present invention will be explained below in detail based on the drawings. Note that, in the following drawings, the same or corresponding units are denoted by the same reference numbers and the explanation thereof is not repeated.

Figure 1:
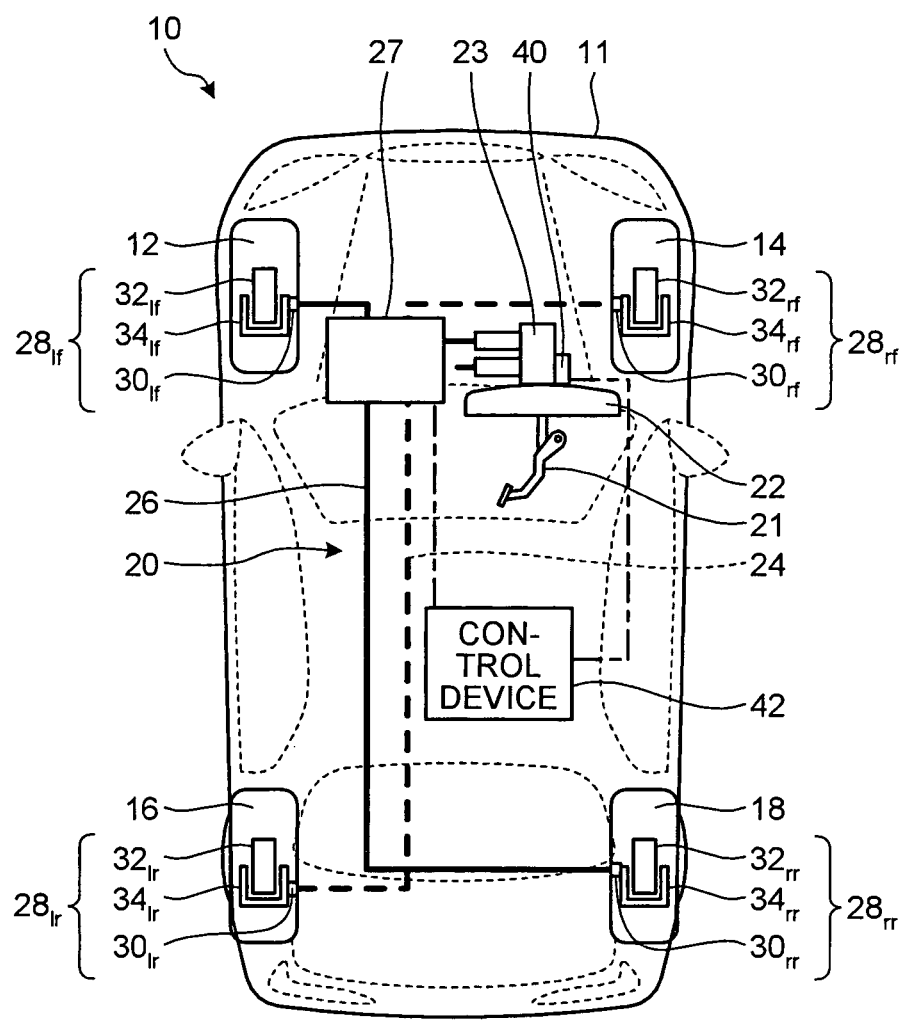
FIG. 1 is a schematic view showing a schematic configuration of a vehicle having a vehicle brake device according to an embodiment of the present invention.

FIG. 1 is a schematic view showing a schematic configuration of a vehicle having the vehicle brake device according to the embodiment of the present invention. As shown in FIG. 1, a vehicle 10 has a vehicle body 11, a left front tire 12, a right front tire 14, a left rear tire 16, a right rear tire 18, a vehicle brake device 20 (hereinafter, called "brake device"), a hydraulic pressure sensor 40, and a control device 42. Note that although illustration is omitted, the vehicle 10 has various types of configurations necessary as the vehicle such as a drive source, a power transmission unit, an operating unit, a seat, and the like in addition to the above configurations.

The vehicle body 11 is a housing of the vehicle 10, i.e. a so-called body. The inside of the vehicle body 11 is provided with the drive source, the power transmission unit, the operating unit, the seat, and the like.

The left front tire 12, the right front tire 14, the left rear tire 16, and the right rear tire 18 are disposed in the four directions of the vehicle body 11 and are in contact with a road surface. The left front tire 12, the right front tire 14, the left rear tire 16, and the right rear tire 18 transmit a drive force to the road surface by being rotated by the drive source and the power transmission unit and move the vehicle body 11 with respect to the road surface.

The brake device 20 has a brake pedal 21 operated by a driver, a brake servo unit (brake booster) 22 for intensifying a pedal depression force input to the brake pedal 21, a master cylinder 23 for converting the pedal depression force intensified by a brake servo unit 22 to the fluid pressure (hydraulic pressure) of a brake fluid, a first hydraulic pressure pipe 24 and a second hydraulic pressure pipe 26 for distributing the hydraulic pressure supplied from the master cylinder 23, a brake actuator 27 disposed in the pipe path of the first hydraulic pressure pipe 24 and the second hydraulic pressure pipe 26, and hydraulic brake units $28_{lf}$, $28_{rf}$, $28_{lr}$, $28_{rr}$ disposed corresponding to the respective tires for generating brake forces by the hydraulic pressure supplied from the first hydraulic pressure pipe 24 and the second hydraulic pressure pipe 26. Note that the first hydraulic pressure pipe 24 is connected to the hydraulic brake unit $28_{rf}$ and the hydraulic brake unit $28_{lr}$. Further, the second hydraulic pressure pipe 26 is connected to the hydraulic brake unit $28_{lf}$ and the hydraulic brake unit $28_{rr}$. Further, the brake device 20 includes also a part of the function of the hydraulic pressure sensor (pressure sensor) 40 and a part of the function of the control device 42.

The brake pedal 21 is an operation input mechanism operated by the driver and is moved in a depressed direction by being depressed by the driver. The brake servo unit 22 is coupled with the brake pedal 21, and when the brake pedal 21 is depressed and moved, the brake servo unit 22 intensifies the pedal depression force input to the brake pedal 21 and transmits the intensified pedal depression force to the master cylinder 23. When the force is transmitted from the brake servo unit 22 to the master cylinder 23, the master cylinder 23 supplies a fluid pressure in response to the transmitted force to the first hydraulic pressure pipe 24 and the second hydraulic pressure pipe 26. Here, the master cylinder 23 has a link mechanism for transmitting the force transmitted from the brake servo unit 22, a first cylinder for supplying a hydraulic pressure to the first hydraulic pressure pipe 24 in response to the force transmitted from the link mechanism, and a second cylinder for supplying a hydraulic pressure to the second hydraulic pressure pipe 26 in response to the force transmitted from the link mechanism. Note that the first cylinder and the second cylinder are filled with an operating oil therein, and when the force is transmitted from the link mechanism to the first cylinder and the second cylinder and the hydraulic pressure therein is made high, the first cylinder and the second cylinder supply a hydraulic pressure to the respective hydraulic pressure pipes. Further, when the state that no pedal depression force is applied to the brake pedal 21 is achieved, the master cylinder 23 restores the hydraulic pressure to a reference hydraulic pressure and presses and returns the position of the brake pedal 21 to a reference position.

Here, when the occupant depresses the brake pedal 21, the operation force (depression force) of the brake pedal 21 is transmitted to the brake servo unit 22. With the operation, a force obtained by intensifying the operation force is transmitted to the master cylinder 23. When the master cylinder 23 is transmitted with the force obtained by intensifying the operation force from the brake servo unit 22, the force is transmitted to the first cylinder and the second cylinder by the link mechanism. Note that the link mechanism transmits the force in series with or in parallel with the first cylinder and the second cylinder. With the operation, the first cylinder and the second cylinder are transmitted with the force in association with each other. When the first cylinder and the second cylinder are transmitted with the force obtained by intensifying the operation force, the volumes in the cylinders are reduced and the hydraulic pressures in the cylinders are made to be a high pressure state. With the operation, the hydraulic pressure of the operating oil of the first cylinder becomes high and the first cylinder ejects the operating oil to the first hydraulic pressure pipe 24 at a constant hydraulic pressure. Further, the hydraulic pressure of the operating oil of the second cylinder also becomes high and the second cylinder ejects the operating oil to the second hydraulic pressure pipe 26 at a constant hydraulic pressure.

The brake actuator 27 is disposed in the pipe path of the first hydraulic pressure pipe 24 and the second hydraulic pressure pipe 26 and adjusts the hydraulic pressures supplied from the master cylinder 23 to the hydraulic brake units $28_{lf}$, $28_{rf}$, $28_{lr}$, $28_{rr}$. Specifically, the brake actuator 27 is a brake fluid pressure adjustment means and adjusts the master cylinder pressure supplied from the master cylinder 23 as it is or to each of the wheels. Note that the brake actuator 27 is composed of a pressure increasing/reducing control valve and the like for increasing and reducing brake fluid pressures to, for example, the respective ones of an oil reservoir, an oil pump, the first hydraulic pressure pipe 24, the second hydraulic pressure pipe 26 and further to the hydraulic pressure pipes corresponding to the respective wheels. Further, the operation of the brake actuator 27 is controlled by the control device 42 to be described later.

The hydraulic brake unit $28_{lf}$ applies a brake force to the left front tire 12, the hydraulic brake unit $28_{rf}$ applies a brake force to the right front tire 14, the hydraulic brake unit $28_{lr}$ applies a brake force to the left rear tire 16, and the hydraulic brake unit $28_{rr}$ applies a brake force to the right rear tire 18. The hydraulic brake unit $28_{lf}$ has a wheel cylinder $30_{lf}$ supplied with the hydraulic pressure, which has been supplied by the second hydraulic pressure pipe 26 from the master cylinder 23 and has passed through the brake actuator 27 (adjusted by the brake actuator 27), a brake rotor $32_{lf}$ rotated together with the wheel (the left front tire 12), and a brake pad $34_{lf}$ which is supported by the vehicle body 11 so as not to rotate, whose position is changed by the wheel cylinder $30_{lf}$, and which comes into contact with the brake rotor $32_{lf}$ at the time of braking. The hydraulic brake unit $28_{lf}$ has the configuration as described above, and when the hydraulic brake unit $28_{lf}$ is supplied with a higher hydraulic pressure (hydraulic pressure at the time of braking) having passed through the brake actuator 27 from the master cylinder 23, the wheel cylinder $30_{lf}$ moves the brake pad $34_{lf}$ in a direction where the brake pad $34_{lf}$ is pressed to the brake rotor $32_{lf}$. With the operation, the brake pad $34_{lf}$ comes into contact with the brake rotor $32_{lf}$ and applies a force to the brake rotor $32_{lf}$ in a direction where the rotation of the brake rotor $32_{lf}$ is stopped. As described above, the hydraulic brake unit $28_{lf}$ applies a brake force to a tire disposed in confrontation with the hydraulic brake unit $28_{lf}$ by the hydraulic pressure supplied from the master cylinder 23 passing through the brake actuator 27.

Next, the hydraulic brake units $28_{rf}$, $28_{lr}$, $28_{rr}$ basically have the same configuration as the hydraulic brake unit $28_{lf}$ except only that the positions where they are disposed (tires disposed corresponding thereto) are different. In the hydraulic brake unit $28_{rf}$, the position of a wheel cylinder $30_{rf}$ is varied by the hydraulic pressure supplied from the first hydraulic pressure pipe 24 (that is, the hydraulic pressure supplied from the master cylinder 23 by the first hydraulic pressure pipe 24 and supplied passing through the brake actuator 27), and, at the time of braking, a brake force is applied to the right front tire 14 by that a high hydraulic pressure is supplied from the first hydraulic pressure pipe 24 to the wheel cylinder $30_{rf}$ and a brake pad $34_{rf}$ is caused to come into contact with a brake rotor $32_{rf}$. In the hydraulic brake unit $28_{lr}$, the position of a wheel cylinder $30_{lr}$ is varied by the hydraulic pressure supplied from the first hydraulic pressure pipe 24, and, at the time of braking, a brake force is applied to the left rear tire 16 by that a high hydraulic pressure is supplied from the first hydraulic pressure pipe 24 to the wheel cylinder $30_{lr}$ and a brake pad $34_{lr}$ is caused to come into contact with a brake rotor $32_{lr}$. In the hydraulic brake unit $28_{rr}$, the position of a wheel cylinder $30_{rr}$ is varied by the hydraulic pressure supplied from the second hydraulic pressure pipe 26, and, at the time of braking, a brake force is applied to the right rear tire 18 by that a high hydraulic pressure is supplied from the second hydraulic pressure pipe 26 to the wheel cylinder $30_{rr}$ and a brake pad $34_{rr}$ is caused to come into contact with a brake rotor $32_{rr}$.

The brake device 20 is configured as described above, and when the occupant depresses the brake pedal 21, the hydraulic pressure is ejected from the master cylinder 23 to the first hydraulic pressure pipe 24 and the second hydraulic pressure pipe 26. With the operation, the hydraulic pressure ejected from a first fluid pressure chamber of the master cylinder 23 is supplied to the hydraulic brake unit $28_{rf}$ and the hydraulic brake unit $28_{lr}$ via the first hydraulic pressure pipe 24. The hydraulic pressure ejected from a second fluid pressure chamber of the master cylinder 23 is supplied to the hydraulic brake unit $28_{lf}$ and the hydraulic brake unit $28_{rr}$ via the second hydraulic pressure pipe 26. The brake pads are caused to come into contact with the brake rotors of the respective hydraulic brake units and the brake forces are applied to the tires by that the hydraulic pressures are ejected from the master cylinder 23 to the respective hydraulic brake units as described above. With the operation, the speed of the vehicle 10 is reduced and the vehicle 10 is stopped.

The hydraulic pressure sensor (pressure sensor) 40 is a hydraulic pressure detecting element for detecting the hydraulic pressure of the master cylinder 23. The hydraulic pressure sensor 40 detects the hydraulic pressure of the operating oil (master cylinder pressure) supplied from the master cylinder 23 to the first hydraulic pressure pipe 24 and/or the second hydraulic pressure pipe 26 and sends a detection result to the control device 42.

Figure 2:
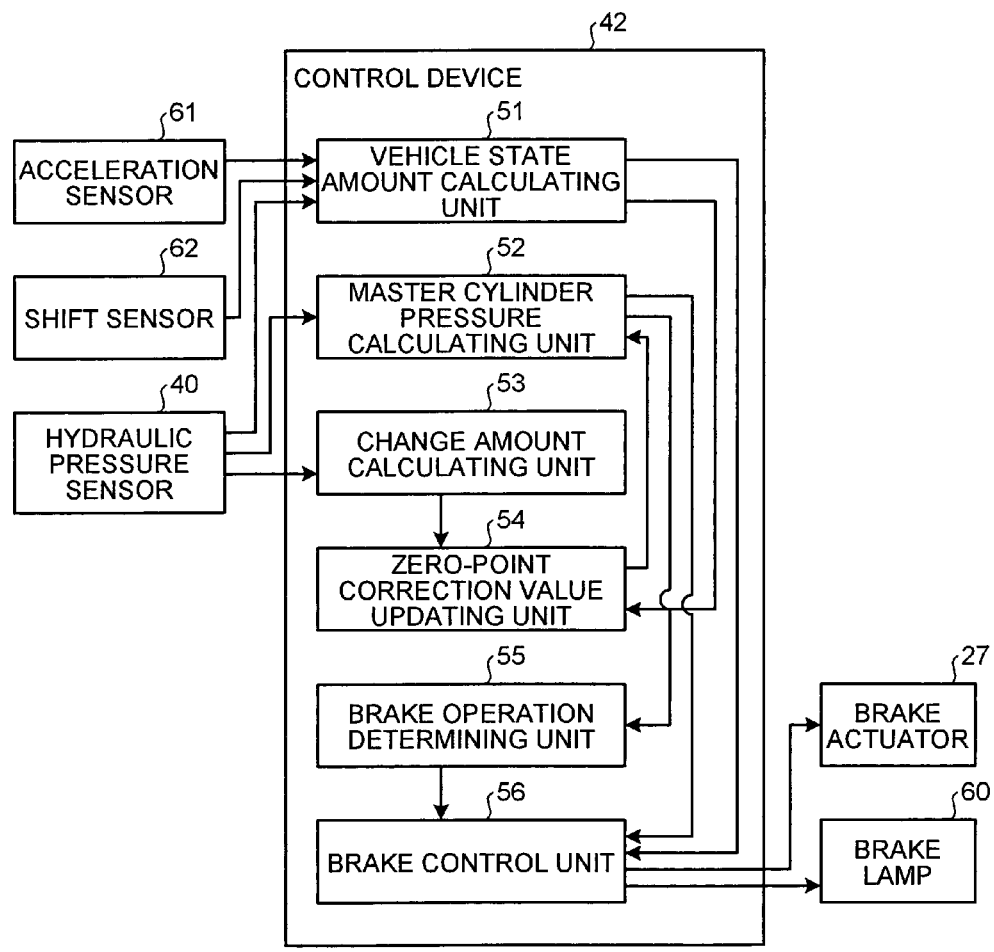
FIG. 2 is a block diagram showing a schematic configuration of a control device shown in FIG. 1.

Next, the control device 42 controls the operations of the respective units of the vehicle 10 based on the detection results of the sensors supplied from the respective units, the input operation, the set conditions, and the like. Here, FIG. 2 is a block diagram showing a schematic configuration of the control device. As shown in FIG. 2, the control device 42 has a vehicle state amount calculating unit 51, a master cylinder pressure calculating unit (pressure calculating unit) 52, a change amount calculating unit 53, a zero-point correction value updating unit 54, a brake operation determining unit 55, and a brake control unit 56.

The control device 42 is coupled with the brake actuator 27, the hydraulic pressure sensor 40, a brake lamp 60, an acceleration sensor 61, and a shift sensor (travel direction detecting unit) 62. Here, the brake lamp 60 is a light emitting element disposed rearward of the vehicle body 11. The brake lamp 60 can cause a following vehicle to recognize whether or not a brake operation is executed by switching turn-on and turn-off. The acceleration sensor 61 detects the acceleration of the vehicle 10, and the shift sensor 62 detects a shift position (a travel direction intended by the driver). Further, the control device 42 is coupled with various types of control targets and detection elements in addition to the brake actuator 27, the hydraulic pressure sensor 40, and the brake lamp 60.

Here, the control device 42 is physically an electronic control unit (ECU) having a CPU (Central Processing Unit), RAM (Random Access Memory) and ROM (Read Only Memory), and the like. The respective functions of the control device 42 shown in FIG. 2 are realized by loading the application program held by the ROM to the RAM and executing the application program by the CPU to thereby operate the various devices in the vehicle 10 under the control of the CPU and as well as to write and read the data in the RAM and the ROM. Note that the functions of the control device 42 are not limited to the functions of the above respective units and the control device 42 has the other various functions used as the ECU of the vehicle 10.

The respective units of the control device 42 will be explained below.

The vehicle state amount calculating unit 51 calculates the state of the vehicle 10 by executing the detection and the arithmetic operation of the state based on the information supplied from the respective units of the control device 42. Here, the vehicle state amount includes the vehicle acceleration detected by the acceleration sensor 61, the shift position information detected by the shift sensor 62, the detection information by the other various types of sensors such as a wheel speed sensor and the like, the control information in the various types of the control devices, the control information and the like by the various actuators, and further a travel speed, an engine revolution number, a transmission condition, a brake operation, a rotation angle, and the like.

The master cylinder pressure calculating unit 52 corrects the output value detected by the hydraulic pressure sensor 40 and calculates the pressure (master cylinder pressure) of the fluid pressure in the master cylinder 23. Here, the master cylinder pressure calculating unit 52 stores the output value of the hydraulic pressure sensor 40 by which an actual master cylinder pressure becomes 0 as a zero-point correction value and corrects the present output value of the hydraulic pressure sensor 40 based on the zero-point correction value.

Since the master cylinder pressure has a characteristic that the master cylinder pressure does not become a negative pressure, the intrinsic output value of the hydraulic pressure sensor 40 does not employ a negative value. However, when the hydraulic pressure sensor 40 causes a zero-point offset in a negative direction, even if an actual master cylinder pressure is 0, the output value of the hydraulic pressure sensor 40 becomes a negative value. Thus, the output value of the hydraulic pressure sensor 40 by which the actual master cylinder pressure becomes 0 is set as the zero-point correction value, the output value of the hydraulic pressure sensor 40 is corrected by subtracting, for example, the zero-point correction value from the output value of the hydraulic pressure sensor 40, and the corrected output value can be calculated as the master cylinder pressure.

The change amount calculating unit 53 calculates the change amount of the master cylinder pressure (the output value of the hydraulic pressure sensor 40). The change amount of the output value of the hydraulic pressure sensor 40 can be determined by, for example, dividing the difference between the present output value of the hydraulic pressure sensor 40 and the just previous output value thereof by the time interval between detection steps.

The zero-point correction value updating unit 54 updates the zero-point correction value stored in the master cylinder pressure calculating unit 52. More specifically, the zero-point correction value updating unit 54 updates the zero-point correction value by that when any of the following conditions is satisfied, the zero-point correction value updating unit 54 sets the output value of the hydraulic pressure sensor 40 at the time as a new zero-point correction value.

(1) The output value detected by the hydraulic pressure sensor 40 is smaller than the present zero-point correction value stored in the master cylinder pressure calculating unit 52.
(2) The acceleration of the vehicle 10 detected by the acceleration sensor 61 is a predetermined value or more.
(3) The travel direction of the vehicle 10 based on the shift position information of the shift sensor 62 is the same as the direction of an acceleration in addition to (2) described above.
(4) The change amount of the master cylinder pressure calculated by the change amount calculating unit 53 is a predetermined value or more in the negative direction in addition to any one of (1) to (3) described above.

The detail of the update process of the zero-point correction value by the zero-point correction value updating unit 54 will be described later referring to FIG. 3.

The brake operation determining unit 55 determines whether a brake operation is input or a brake operation is not input. Here, the brake operation determining unit 55 determines whether the brake operation is input (the brake operation is executed) in the state or the brake operation is not input (the brake operation is not executed) in the state based on the master cylinder pressure calculated by the master cylinder pressure calculating unit 52. Specifically, when the master cylinder pressure is equal to or more than a predetermined threshold value, it is determined that the brake operation is input and the brake operation is executed in the state, and when the master cylinder pressure is smaller than threshold value, it is determined that the brake operation is not input and the brake operation is not executed in the state. The threshold value is a previously set value and a reference value for determining whether or not the brake operation is executed, that is, whether or not the brake operation is input.

The brake control unit 56 controls the operation of the brake actuator 27 based on the vehicle state amount calculated by the vehicle state amount calculating unit 51, the determination result of the brake operation determining unit 55, the operation input by an operator, and the master cylinder pressure calculated by the master cylinder pressure calculating unit 52. For example, the brake control unit 56 controls the brake actuator 27 based on the master cylinder pressure calculated by the master cylinder pressure calculating unit 52, feed-back controls the master cylinder pressure supplied from the master cylinder 23 to a hydraulic brake unit 28, and controls the brake force acting on the respective wheels of the vehicle 10.

Further, the brake control unit 56 determines the turn-on of the brake lamp 60 and the control reference states of the various types of the brake operations based on the determination result of the brake operation determining unit 55. When, for example, the determination result of the brake operation determining unit 55 is "the state that the brake operation is input and the brake operation is executed", the brake control unit 56 turns on the brake lamp 60, whereas when the determination result is "the state that the brake operation is not input and the brake operation is not executed", the brake control unit 56 turns off the brake lamp 60.

Next, referring to FIG. 3, the update process of the zero-point correction value of the embodiment will be explained. FIG. 3 is a flowchart showing the update process of the zero-point correction value by the brake device 20 of the embodiment. The process shown in FIG. 3 can be executed by that the control device 42 causes the zero-point correction value updating unit 54 and the change amount calculating unit 53 to execute the process based on the information supplied from the sensors such as the hydraulic pressure sensor 40, the acceleration sensor 61, the shift sensor 62, and the like. Further, the process shown in FIG. 3 is a process started when an engine of the vehicle 10 is started (when an ignition is turned on) and repeatedly executed until the time at which the engine is stopped (at the time the ignition is turned off), and after these processes has been finished, the updated zero-point correction value is reset.

First, the initial value of the zero-point correction value for correcting the output value of the hydraulic pressure sensor 40 is set by the zero-point correction value updating unit 54 in response to that the engine is started (S11). Although the initial value of the zero-point correction value can be set to a previously set optional value, in particular, the initial value is preferably set to a maximum value in the predetermined range of the output values capable of being employed by the hydraulic pressure sensor 40 when the master cylinder pressure is actually 0. This is because of the following reason.

In the pressure sensor such as the hydraulic pressure sensor 40 and the like, the predetermined range of the output values which can be employed when the pressure is 0 is previously determined in consideration of single item characteristics, variation per hour such as a temperature drift and the like, and time degradation. Further, since a configuration of recent vehicles is ordinarily such that an engine cannot be started unless the brake pedal 21 is depressed. Thus, when the update process of the zero-point correction value shown in FIG. 3 is started, a state is such that the brake pedal 21 is certainly depressed and the master cylinder pressure is set to a value considerably larger than 0 and the output value of the hydraulic pressure sensor 40 is set to a value considerably larger than the predetermined range. Further, as described later, when the output value of the hydraulic pressure sensor 40 is out of the predetermined range which can be employed when the master cylinder pressure is 0, the zero-point correction value is not updated in the embodiment. That is, the zero-point correction value cannot be updated for a certain period after the update process of the zero-point correction value has been started. Accordingly, when the initial value of the zero-point correction value is determined at random, at the time of engine start, there is a possibility that the accuracy of the master cylinder pressure, which is calculated by correcting the output value of the hydraulic pressure sensor 40 by the master cylinder pressure calculating unit 52 based on the zero-point correction value, is reduced. Thus, the embodiment is configured such that it can be suppressed that the calculation accuracy of the master cylinder pressure is reduced when the engine starts by setting the maximum value of the range which can be employed when the pressure is 0 (for example, in a sensor having such characteristics that the output voltage range when the master pressure is 0 becomes 1.0 to 1.1 volt, the maximum value is 1.1 volt) as the initial value of the zero-point correction value.

Next, the zero-point correction value updating unit 54 determines whether or not the output value of the hydraulic pressure sensor 40 is smaller than a present zero-point correction value (S12). The determination process may be sequentially executed each time an output value corresponding to the master cylinder pressure is detected by the hydraulic pressure sensor 40 or may be collectively executed after the output values of a predetermined number of times are accumulated. When it is determined that the output value of the hydraulic pressure sensor 40 is smaller than the present zero-point correction value, a process goes to step S16 assuming that the hydraulic pressure sensor 40 causes a zero-point offset in the negative direction.

At step S12, when it is determined that the output value of the hydraulic pressure sensor 40 is equal to or more than the present zero-point correction value, subsequently, at steps S13 to S15, it is determined whether or not the hydraulic pressure sensor 40 causes a zero-point offset in a positive direction.

First, the change amount of the output value of the hydraulic pressure sensor 40 is calculated by the change amount calculating unit 53, and whether or not the change amount of the hydraulic pressure sensor 40 is equal to or more than a predetermined value in the negative direction, that is, whether or not the output value of the hydraulic pressure sensor 40 is reduced a predetermined value or more from just before is determined by the zero-point correction value updating unit 54 (S13). The change amount of the output value of the hydraulic pressure sensor 40 is determined by, for example, dividing the difference between the output value of the hydraulic pressure sensor 40 at the present step and the output value before one step by the time interval between the steps. When it is determined that the output value of the hydraulic pressure sensor is reduced equal to or more than the predetermined value, this shows that the brake pedal 21 is returned just before the determination and the master cylinder pressure is reduced, and thus the process goes to step S14 assuming that there is a high possibility that a non-braked state exists at the time. When the reduction of the output value of the hydraulic pressure sensor is smaller than the predetermined value, since there is a possibility that the brake pedal 21 is continuously depressed, the update process of the zero-point correction value is interrupted once and the process is returned to step S12.

At step S13, when it is determined that the reduction of the output value of the hydraulic pressure sensor is equal to or more than the predetermined value, the zero-point correction value updating unit 54 determines whether or not the acceleration of the vehicle 10 detected by the acceleration sensor 61 is equal to or more than a predetermined value (S14). When it is determined that the acceleration is equal to or more than the predetermined value, the process goes to step S15 assuming that there is a high possibility that the vehicle 10 travels while being accelerated and is in the non-braked state. When it is determined that the acceleration is smaller than the predetermined value, since there is a possibility that the vehicle 10 travels at a constant speed or in a stop state and the brake is depressed, the update process of the zero-point correction value is interrupted once and the process is returned to step S12.

At step S14, when it is determined that the acceleration of the vehicle 10 is equal to or more than the predetermined value, the travel direction of the vehicle 10 is detected by the zero-point correction value updating unit 54 based on the shift position information detected by the shift sensor 62, and it is determined whether or not the travel direction of the vehicle 10 agrees with the direction of the acceleration of the vehicle 10 used at step S14 (S15). When the travel direction agrees with the acceleration direction, the process goes to step S16 assuming that there is a high possibility that the vehicle 10 travels while being accelerated by the accelerator operation of the driver and is in the non-braked state. When the travel direction does not agree with the acceleration direction, since there is contemplated, for example, the status that the vehicle 10 gradually moves downward in a direction opposite to a travel direction on a slope road and the like regardless that the brake operation is executed and there is a possibility that the brake is depressed, the update process of the zero-point correction value is interrupted once and the process is returned to step S12.

As described above, when it is determined at step S12 that the output value of the hydraulic pressure sensor 40 is smaller than the zero-point correction value, it is considered that the hydraulic pressure sensor 40 causes the zero-point offset in the negative direction. In contrast, when it is determined at step S15 via step S13, S14 that the travel direction agrees with the acceleration direction, since it is considered that, at the time, the vehicle 10 is in the non-braked state and the master cylinder pressure is in the state of 0, if the hydraulic pressure sensor 40 causes the zero-point offset in the positive direction, it is considered that the zero-point offset amount of the zero-point offset can be detected. Thus, in these cases, the update process of the zero-point correction value is executed at the following steps. S16, S17.

First, as a pre-step of the update process, it is determined by the zero-point correction value updating unit 54 whether or not the output value of the hydraulic pressure sensor 40 is within the predetermined range of the output values which can be employed when the pressure is 0 (S16). The predetermined range which can be employed by the output value of the hydraulic pressure sensor 40 when the pressure is 0 can be prescribed to each of the sensors based on the single item characteristics, the variation per hour, the time degradation, and the like as described above. When it is determined that the output value of the hydraulic pressure sensor 40 is not within the predetermined range, the update process of the zero-point correction value is interrupted once and the process is returned to step S12 assuming that the variation of the output value of this time is not caused by the zero-point offset of the hydraulic pressure sensor 40 and is caused by other factor such as noise and the like.

When it is determined at step S16 that the output value of the hydraulic pressure sensor 40 is within the predetermined range, the present output value of the hydraulic pressure sensor 40 is set as the new zero-point correction value by the zero-point correction value updating unit 54 and the zero-point correction value is updated (S17).

Then, whether or not the engine is stopped (the ignition is turned off) and the operation of the vehicle 10 is finished is determined (S18), and when the operation is continued, the process returns to step S12 and the update process is repeated, whereas when the operation is finished, the process is finished.

Note that, in the update process of the zero-point correction value, steps S13 to S15 for determining whether or not the hydraulic pressure sensor 40 causes the zero-point offset in the positive direction may be configured such that at least one of the steps is executed. For example, a configuration in which step S14 (whether or not the acceleration is equal to or more than the predetermined value) and step S15 (whether or not acceleration direction agrees with the travel direction) are executed, a configuration in which only step S14 is executed, and a configuration in which step S13 (whether or not the reduction of the pressure sensor is equal to or more than the predetermined value) and step S14 are executed may be employed.

Further, a configuration in which step S13 (whether or not the reduction of the pressure sensor is equal to or more than the predetermined value) may be added after it is determined that the hydraulic pressure sensor 40 has caused the zero-point offset in the negative direction (YES at step S12).

Further, a configuration in which the steps S13 to S15 for determining whether or not the hydraulic pressure sensor 40 causes the zero-point offset in the positive direction are not included may be employed. In the case, when it is determined at step S12 that the output value of the hydraulic pressure sensor 40 is equal to or more than the present zero-point correction value, the process at step S12 is repeated until it is determined that the output value is smaller than the zero-point correction value. As described above, in the configuration in which only whether or not the hydraulic pressure sensor 40 causes the zero-point offset in the negative direction is determined, the output values of the hydraulic pressure sensor 40 of one operation cycle (from the start of the engine to the stop of the engine) may be collectively stored, a minimum value may be extracted from the output values, and the minimum value may be set as the new zero-point correction value.

Next, the operation/working-effect of the vehicle brake device 20 of the embodiment will be explained.

As described above, in the conventional vehicle brake device, the zero-point correction value for correcting the output value of the hydraulic pressure sensor 40 is updated in response to the secular variation and the aged deterioration of the hydraulic pressure sensor 40. A chance for updating the zero-point correction value is preferably the state that the actual pressure of the master cylinder 23 becomes 0, that is, the state that the brake operation is not executed by the driver and the brake pedal is not depressed. Thus, conventionally, to determine the state that the brake operation of the driver is not executed, the state of a brake lamp switch showing the turn-on/turn-off of a brake lamp is confirmed, and when the brake lamp switch is turned off, the zero-point correction value is updated assuming that the brake operation is not executed.

In contrast, in the vehicle brake device 20 of the embodiment, when the output value of the hydraulic pressure sensor 40 is smaller than the present zero-point correction value, the zero-point correction value updating unit 54 sets the output value at the time as the new zero-point correction value and updates the zero-point correction value.

Since the pressure of the master cylinder 23 has the characteristics that the pressure does not become the negative pressure, when no zero-point offset in the negative direction is caused to the hydraulic pressure sensor 40, the output value of the hydraulic pressure sensor 40 cannot help employing a value equal to or more than the present zero-point correction value. In contrast, the state that the output value of the hydraulic pressure sensor 40 becomes smaller than the zero-point correction value means that a value which cannot be intrinsically employed by the master cylinder pressure is detected, and the state shows that the output value of the hydraulic pressure sensor 40 in which the actual master cylinder pressure becomes 0 is drifted in a direction where the output value is smaller than a value set at the time. That is, since "the case that the output value of the hydraulic pressure sensor 40 is smaller than the present zero-point correction value" shows that it can be assumed that the present master cylinder pressure is 0 and the non-braked state exists, it is considered that this is a timing suitable for updating the zero-point correction value as well as since the zero-point correction value set at the time is offset from the actual master cylinder pressure, it is considered that the zero-point correction value is in the status that it is to be updated.

As described above, the vehicle brake device 20 of the embodiment can identify the status in which the zero-point correction value is to be updated by comparing the output value of the hydraulic pressure sensor 40 with the zero-point correction value without particularly determining whether or not the non-braked state exists. Accordingly, even in, for example, a brake system provided with no stop lamp switch and even when abnormality occurs in a stop lamp switch, the zero-point correction value of the hydraulic pressure sensor 40 for detecting the master cylinder pressure can be updated at an appropriate timing. With the operation, since the master cylinder pressure can be accurately calculated from the output value of the hydraulic pressure sensor 40, the brake operation amount of the driver can be accurately estimated. As a result, the switch control of the turn-on/the turn-off of the brake lamp and the brake control of the respective wheels based on the estimated brake operation amount can be accurately executed.

Further, when the acceleration of the vehicle 10 is equal to or more than the predetermined value, it is the state that the driver depresses the accelerator pedal and the vehicle 10 is accelerated, and thus it is difficult to consider that the brake operation is executed at the same time. That is, when the acceleration is equal to or more than the predetermined value, it can be said that it is the state that no brake operation is executed and it is the timing at which the zero-point correction value can be updated.

Thus, in the vehicle brake device 20 of the embodiment, when the acceleration of the vehicle 10 detected by the acceleration sensor 61 is equal to or more than the predetermined value, the zero-point correction value updating unit 54 sets the output value of the hydraulic pressure sensor 40 at the time as the new zero-point correction value. With the operation, even when the hydraulic pressure sensor 40 causes the zero-point offset in the positive direction, the zero-point correction value can be updated at a more appropriate timing.

Further, in the vehicle brake device 20 of the embodiment, when the acceleration of the vehicle 10 is equal to or more than the predetermined value as well as the travel direction of the vehicle 10 detected by the shift sensor 62 is the same as the direction of the acceleration, the zero point correction value updating unit 54 sets the output value detected by the hydraulic pressure sensor 40 at the time as the new zero point correction value.

With configuration, when the vehicle 10 is accelerated forward while travelling forward or when the vehicle 10 is accelerated backward while travelling backward, since it is estimated that the vehicle 10 is being accelerated in the non-braked state, the zero-point correction value can be updated. In contrast, even if an acceleration is executed in a predetermined amount or more, in the state that the vehicle 10 moves in a direction different from that intended by the driver such as when, for example, the vehicle 10 gradually moves backward on a slope road, since there is a high possibility that the travel is not intended by the driver and the brake operation is executed, the update is not executed in the status. As described above, the zero-point correction value can be updated at a more appropriate timing.

Further, in the vehicle brake device 20 of the embodiment, when the change amount calculating unit 53 calculates the change amount of the output value (the master cylinder pressure) of the hydraulic pressure sensor 40, and the change amount calculated by the change amount calculating unit 53 is equal to or more than the predetermined value in the negative direction, the zero-point correction value updating unit 54 sets the output value detected by the hydraulic pressure sensor 40 at the time as the zero-point correction value. With the configuration, in the state that the change amount of the master cylinder pressure equal to or more than the predetermined value in the negative direction exists, that is, when it is determined that the driver releases the brake just before and the brake pedal is returned, it is estimated that the non-braked state exists and the zero-point correction value can be updated. Accordingly, the zero-point correction value can be updated at a more appropriate timing.

Further, in the vehicle brake device 20 of the embodiment, the initial value of the zero-point correction value is made to the maximum value in the predetermined range of the output values which can be employed by the hydraulic pressure sensor 40 when the actual pressure of the master cylinder 23 is 0. With the configuration, when the engine starts, it can be suppressed that the zero-point correction value employs an extreme value, and it can be suppressed that the calculation accuracy of the master cylinder pressure by the master cylinder pressure calculating unit 52 based on the zero-point correction value is reduced.

Although the preferable embodiments are shown and explained above as to the present invention, the present invention is by no means limited by these embodiments. In the embodiments, the maximum value and the minimum value in the predetermined range which can be employed by the output values of the hydraulic pressure sensor 40 when the master cylinder pressure is 0 and the magnitude relation between the output value of the hydraulic pressure sensor 40 and the zero-point correction value suppose the case that the output value of the hydraulic pressure sensor 40 employs a positive value. When the output value of the hydraulic pressure sensor 40 is configured to employ the negative value, since a larger master cylinder pressure more reduces the output value of the hydraulic pressure sensor (increases the output value in the negative direction), it is assumed that the magnitude relation is based on the absolute value of the output value of the hydraulic pressure sensor 40.

REFERENCE SIGNS LIST

20 . . . vehicle brake device, 23 . . . master cylinder, 40 . . . hydraulic pressure sensor (pressure sensor), 52 . . . master cylinder pressure calculating unit (pressure calculating unit), 53 . . . change amount calculating unit, 54 . . . zero-point correction value updating unit, 56 . . . brake control unit, 61 . . . acceleration sensor, 62 . . . shift sensor (travel direction detecting unit)

The invention claimed is:

1. A vehicle brake device comprising:
a master cylinder configured to adjust a fluid pressure for acting a brake force to respective wheels of a vehicle in response to a brake operation amount of a driver;
a pressure sensor configured to detect an output value corresponding to a pressure of the fluid pressure adjusted by the master cylinder; and
a pressure calculator configured to store the output value of the pressure sensor at which an actual pressure of master cylinder becomes 0 as a zero-point correction value, and calculate the pressure by correcting the output value detected by the pressure sensor based on the zero-point correction value, wherein
when the output value detected by the pressure sensor is smaller than the zero-point correction value stored in the pressure calculator, a zero-point correction value updator sets the output value as a new zero-point correction value and updates the zero-point correction value.

2. The vehicle brake device according to claim 1, further comprising:
an acceleration sensor configured to detect an acceleration of the vehicle, wherein
when the acceleration of the vehicle detected by the acceleration sensor is equal to or more than a predetermined value, the zero-point correction value updator sets the output value detected by the pressure sensor as a new zero-point correction value.

3. The vehicle brake device according to claim 2, further comprising:
a travel direction detector configured to detect a travel direction of the vehicle, wherein
when the acceleration of the vehicle detected by the acceleration sensor is equal to or more than the predetermined value as well as the travel direction of the vehicle detected by the travel direction detector is the same as the direction of the acceleration, the zero-point correction value updator sets the output value detected by the pressure sensor as a new zero-point correction value.

4. The vehicle brake device according to claim 1, further comprising:
a change amount calculator configured to calculate a change amount of the master cylinder pressure, wherein
when the change amount calculated by the change amount calculator is equal to or more than a predetermined value in a negative direction, the zero-point correction value updator sets the output value detected by the pressure sensor as a new zero-point correction value.

5. The vehicle brake device according to claim 1, wherein when the actual pressure of the master cylinder is 0, an initial value of the zero-point correction value is made to be a maximum value in the predetermined range of the output values which can be employed by the pressure sensor.

6. The vehicle brake device according to claim 2, further comprising:
a change amount calculator configured to calculate a change amount of the master cylinder pressure, wherein
when the change amount calculated by the change amount calculator is equal to or more than a predetermined value in a negative direction, the zero-point correction value updator sets the output value detected by the pressure sensor as a new zero-point correction value.

7. The vehicle brake device according to claim 1, further comprising:
a change amount calculator configured to calculate a change amount of the master cylinder pressure, wherein
when the change amount calculated by the change amount calculator is equal to or more than a predetermined value in a negative direction, the zero-point correction value updator sets the output value detected by the pressure sensor as a new zero-point correction value.

8. The vehicle brake device according to claim 2, wherein when the actual pressure of the master cylinder is 0, an initial value of the zero-point correction value is made to be a maximum value in the predetermined range of the output values which can be employed by the pressure sensor.

9. The vehicle brake device according to claim 3, wherein when the actual pressure of the master cylinder is 0, an initial value of the zero-point correction value is made to be a maximum value in the predetermined range of the output values which can be employed by the pressure sensor.

10. The vehicle brake device according to claim 4, wherein when the actual pressure of the master cylinder is 0, an initial value of the zero-point correction value is made to be a maximum value in the predetermined range of the output values which can be employed by the pressure sensor.

* * * * *